Figures 1, 2, 3:
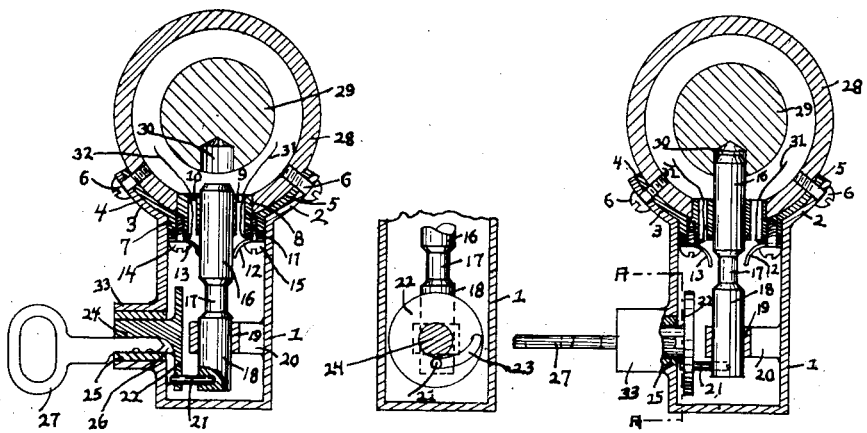

C. U. FOLSTER.
AUTO LOCK.
APPLICATION FILED JUNE 2, 1919.

1,329,391.

Patented Feb. 3, 1920.
2 SHEETS—SHEET 1.

Clarence U. Folster INVENTOR.

BY

William E. Baff. ATTORNEY.

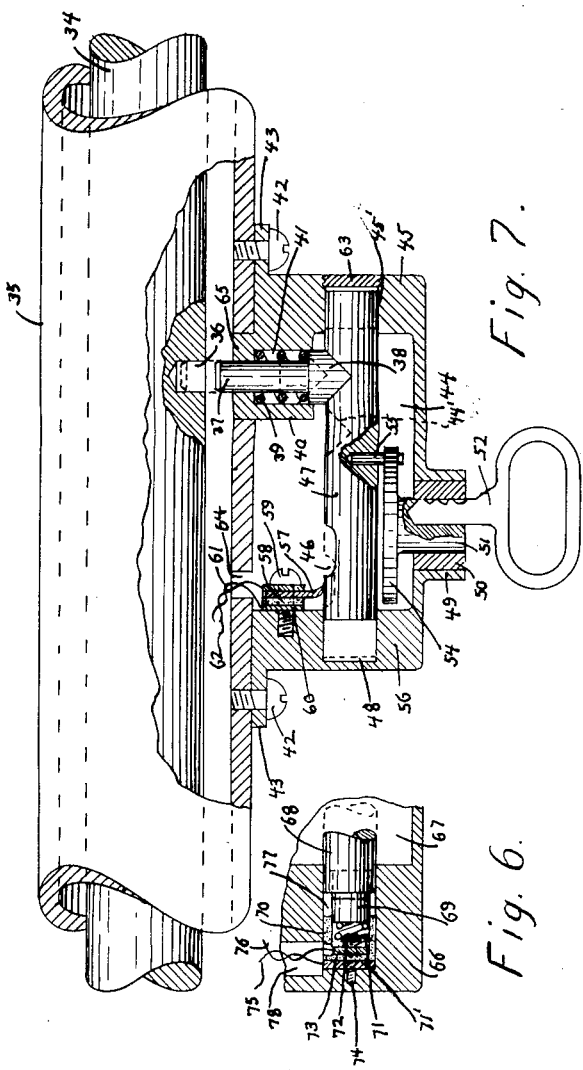

UNITED STATES PATENT OFFICE.

CLARENCE U. FOLSTER, OF WORCESTER, MASSACHUSETTS, ASSIGNOR OF ONE-HALF TO PATRICK F. O'HARA, OF WORCESTER, MASSACHUSETTS.

AUTO-LOCK.

1,329,391.  Specification of Letters Patent.  Patented Feb. 3, 1920.

Application filed June 2, 1919. Serial No. 301,367.

*To all whom it may concern:*

Be it known that I, CLARENCE U. FOLSTER, a citizen of the United States, residing at the city of Worcester, in the county of Worcester and State of Massachusetts, have invented new and useful Improvements in Auto-Locks, of which the following is a specification.

This invention relates to improvements in automobile locks and more specifically to means for preventing the turning of the steering post of an automobile as well as to means for cutting off the power of the automobile engine.

The purpose of this invention is to prevent the theft of automobiles in so far as a mechanical lock can be made to increase the difficulty of moving an automobile or otherwise hampering the free propulsion or movement thereof.

Another object of this invention is to provide a simple, efficient, and inexpensive device of this character which is in the nature of a simple attachment to the steering post of an automobile, the arrangement being such as to lock the steering post against rotation and at the same time cut out the ignition system of the automobile.

A still further object of my invention is to provide a casing equipped with novel mechanism including a bolt serving as a circuit maker and breaker connected to the ignition circuit of an automobile engine.

With the above and other objects in view my invention consists in the combination, arrangement, and details of construction disclosed in the drawings and specification, and then more particularly pointed out in the appended claims.

Figure 4:
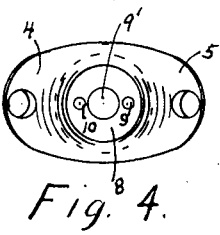
Figure 5:
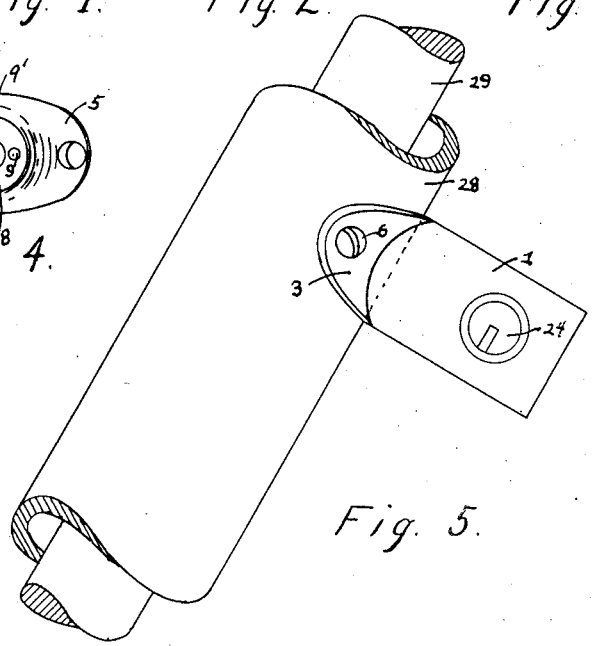

In the drawings wherein similar reference characters designate similar parts throughout the respective views, Figure 1 is a cross-sectional view of one form of my invention showing the locking bolt retracted, Fig. 2 is a fragmental view taken at right angles to Fig. 1 and showing certain parts thereof, Fig. 3 is a view similar to Fig. 1 but showing the parts thereof in locked position, Fig. 4 is a top plan view of a bushing to be further described, Fig. 5 is an elevation, partly in section, of a steering rod, and incasing sleeve therefor, showing my invention applied thereon, Fig. 6 is a fragmental sectional view illustrating a modified form of my invention, and Fig. 7 is a longitudinal sectional view of another modification of my invention.

Referring to the drawings which are merely illustrative of my invention, 1 designates a suitable casing which may be secured operatively around or to the sleeve 28 of an automobile, this sleeve incasing the usual steering post 29. Any desirable means of attaching the casing 1 to the sleeve may be employed, and by way of example the curved oppositely-extending lugs 2 and 3 of the casing bear against similarly curved lugs 4 and 5 formed upon a bushing 8 projecting through an opening (not designated) in the sleeve 28 and also fitting snugly within the casing 1. Screws or other fastenings 6 secure the lugs of the casing and bushing upon the sleeve 28. The bushing 8 has a central opening 9' and opposed ports 9 and 10, as shown clearly in Fig. 4, or a single port may be utilized with equally satisfactory results. Two wires 31 and 32 leading to the ignition system of an automobile engine extend longitudinally within the space between the steering post 29 and the sleeve 28, and they may either pass through one port or separately through the ports 9 and 10 of the bushing 8, the wires being attached respectively to the spring arms 12 and 13 which bear against an insulating fiber 11 and are secured rigidly against the underside of the bushing by means of the screws 14 and 15. The spring fingers curve forwardly and downwardly and exert spring pressure against the periphery of the locking bolt 16 so as to resist the easy movement of this locking bolt, the latter serving as a switch to connect these fingers 12 and 13 so as to close the ignition circuit through the wires 31 and 32. The bolt, however, serves not only as a circuit maker but as a circuit breaker as well. It will be seen that the bolt is formed with an intermediate groove 17, and projects slidably in the opening 9' of the bushing so as to be guided thereby. If desired (as it may not be necessary) a sleeve 19 may be provided to further guide the locking bolt in movement, being formed upon an arm 20 secured in the casing. A pin 21 projects at right angles from the lower end of the bolt 16 and projects into the cam slot 23 formed upon a cam 21 formed upon a circular stem 24 journaled in a bushing 25 mounted in a hollow boss 33 extending at right angles outwardly from the casing 1. Any suitable key hole or notch 26 may be formed upon the stem 24 receiving the key 27. When the key is turned the stem turns carrying the cam around, which, through its cam slot operates the pin 21 thereby projecting the locking bolt 16 forwardly and causing the bolt to take into the notch 30 formed upon the steering post 29. As illustrated in Fig. 3 when the bolt is in unlocked position and prevents the steering post from turning the annular grooved portion 17 of the bolt is presented opposite the spring fingers 12 and 13 which are thus caused to project into the groove and are placed out of contact with the switch bolt 16. The ignition circuit is thus broken. If desired a series of notches 30 may be formed in the steering post, thus permitting the front wheels of the machine being steered and left in this position, before the bolt is projected into one of the notches.

Fig. 7 illustrates a modification of my invention. The steering post is designated 34 and the steering sleeve 35. 36 designates a notch formed upon the post 34 and adapted to enter this notch is a locking plunger 37 guided in an opening in the boss 65 formed upon a suitable casing 45, this plunger having a suitable head 38 which is beveled at opposite sides and is adapted to enter a V-shaped notch 44' formed in a member or bolt 47 arranged at right angles to the plunger 37, the head of which bears against a coiled spring 39 mounted in a chamber 41 formed in the web 40 of the boss 65. A pin 55 is carried by the bolt 47 and projects into a cam slot (not shown) similar to the cam slot 23 shown in Fig. 2 formed upon the cam 54 mounted upon the key-receiving stem 51 fitting the bushing 50 mounted in the circular boss 49. The key 52 is readily removable from the circular boss 49. The bolt 47 is formed with a recess or notch 46 and its terminals have their bearings within the openings 45' and 48 formed upon the casing 45. 60 designates a spring contact against which bears an insulated block 58 against which bears a spring contact 57 which bears against the bolt 47. A screw 59 is insulatedly secured against the spring 57 and jams the spring 60 against the casing, said screw being tapped into said casing. Electric wires 61 and 62 are secured to the contacts 60 and 57, said wires projecting through the opening 64 in sleeve 35. The bolt 41 serves as a switch to connect the metal casing, arm 60, spring 57 together in a closed ignition circuit, it being understood that the parts of this device will be suitably insulated when necessary. In operation, the user turns the key 52, which turns the cam 54, which, through pin 55 moves bolt 47 causing it to move towards the left thereby causing the beveled walls of the V-shaped notch 44' to act against the similar walls of the head 38 of the plunger 37, and, as a consequence, this plunger is forced forwardly against the tension of spring 39, and enters the notch 36 to prevent the turning of the steering post within the sleeve 35. As the bolt 47 thus moves, the spring 57 projects into the notch 46 and is thus out of contact with the bolt, whereby the ignition circuit will be broken.

Another modification of my invention is disclosed in Fig. 6. The slidable bolt 68 fits a bore 77 formed in a casing 66, and operates a similar plunger as that shown in Fig. 7 in a manner similarly to that already explained. The reduced portion 69 of the bolt 68 slidably projects into an insulator piece 70 also fitting said bore 77 and has one end of a spring 71 secured thereto, this spring normally causing the portion 69 to abut the head 72 of a screw 74, said screw being attached to the casing 66. The contact arm 71' is secured to the insulator 70 and has a wire 75 attached thereto and it is separated by the back wall of the insulator piece 70, from another contact arm having wire 76 attached thereto, this latter arm 71' contacting the casing 66 which forms part of the electrical circuit, but the other contact arm to which the wire 76 is attached does not contact the casing and what is needed to complete the circuit is the contact made by bolt 68 with screw head 72 and with casing 67, as will readily be understood.

Numerous modifications can be resorted to in practice without departing in principle from the details of construction herein disclosed.

What I desire to claim and seek protection on is:—

1. In a device as described, in combination having an opening, a sleeve, a steering post turning therein, a casing secured to said sleeve, a bushing carried by said casing and projecting into said opening, said bushing having a central opening and opposing small bores, a bolt slidably mounted in the central opening, a pair of springs insulatedly secured to said bushing, wires secured to said springs and projecting through said bores, said springs normally bearing against the periphery of said bolt, said bolt having a recess into which said springs may project so as to be disengaged from the bolt, and key-controlled mechanism carried by said casing and adapted to actuate said bolt to project it into said opening notch so as to register the recess of the bolt opposite said springs.

2. In a device as described, in combination, a sleeve, a steering post turning therein, a casing secured to said sleeve, said sleeve having an opening, and said post having a notch, a bushing connected so as to close the front of said casing and projecting into said opening, a bolt slidably disposed in said bushing, key controlled rotary means for reciprocating said bolt, causing it to project into and be retracted from said notch, a pair of elecertic contact springs against which said bolt bears as it slides, said bolt and contact springs being disposed in said casing, and mean whereby said bolt may bodily serve as a switch adapted to connect and disconnect said springs.

3. In a device as described, in combination, a sleeve, a steering post turning therein, a casing having an open front and curved portions extending around said sleeve, a bushing having curved portions extending around and engaging directly against said sleeve and being surmounted by said casing curved portions, means for securing the curved portions of said casing and bushing against said sleeve, said sleeve having an opening and said steering post having a notch, a locking bolt slidably mounted in said bushing, means at right angles to said bolt for reciprocating it, causing it to enter said notch and to be retracted therefrom, an electrical circuit, and a make and break contact arrangement included in said circuit, controlled by said bolt as it moves and simultaneously applying spring pressure thereagainst.

In witness whereof I have hereunto set my hand this 31st day of May, 1919.

CLARENCE U. FOLSTER.

Attested:
WILLIAM E. BAFF,
SILAS H. LORD.